US006873180B2

(12) United States Patent
Bentz

(10) Patent No.: US 6,873,180 B2
(45) Date of Patent: *Mar. 29, 2005

(54) MULTI-ACCESS FIFO QUEUE

(75) Inventor: Ole Bentz, Portland, OR (US)

(73) Assignee: Micron Technology, Inc., Boise, ID (US)

(*) Notice: Subject to any disclaimer, the term of this patent is extended or adjusted under 35 U.S.C. 154(b) by 77 days.

This patent is subject to a terminal disclaimer.

(21) Appl. No.: 10/395,576

(22) Filed: Mar. 24, 2003

(65) Prior Publication Data
US 2003/0141897 A1 Jul. 31, 2003

Related U.S. Application Data

(63) Continuation of application No. 09/933,988, filed on Aug. 20, 2001, now Pat. No. 6,538,467.

(51) Int. Cl.[7] ................................................. G11C 7/00
(52) U.S. Cl. .................................... 326/38; 365/189.12
(58) Field of Search ............................. 326/37, 38, 46, 326/82; 365/189.2, 219–221; 345/558

(56) References Cited

U.S. PATENT DOCUMENTS

| 5,710,943 A | 1/1998 | Burton et al. ................. 710/52 |
| 6,172,927 B1 | 1/2001 | Taylor ........................ 365/219 |
| 6,314,478 B1 | 11/2001 | Etcheverry ................... 710/29 |

Primary Examiner—Don Le
(74) Attorney, Agent, or Firm—Schwegman, Lundberg, Woessner & Kluth, P.A.

(57) ABSTRACT

FIFO queues enable multiple accesses to data stored therein. A release pointer points to a queue location containing previously read data until a release signal is asserted that changes the release pointer while a read pointer is used to read data from the queue. The repeat signal allows the read pointer to reread previously read data. Asserting the repeat signal sets the read pointer to the value of the release pointer. Once data is no longer needed, the release signal is asserted, causing the release pointer to be incremented with the read pointer thereby freeing memory locations. FIFO queues may comprise multiple release pointers, multiple release and multiple repeat signals. FIFO queues may also comprise a switch signal, which causes the read pointer to switch values with a release pointer. FIFO queues may comprise multiple read pointers and an input signal for determining which read pointer is used.

33 Claims, 4 Drawing Sheets

```
for (i = 0; i < number_of_repeats; i++) {
    for (j = fifoEntry1; j <= fifoEntry2; j++) {
        data = FIFO[j];
        < use "data" for something >
    }
}
```

FIG. 4

MULTI-ACCESS FIFO QUEUE

RELATED APPLICATION(S)

This application is a Continuation of U.S. application Ser. No. 09/933,988 filed on Aug. 20, 2001 now U.S. Pat. No. 6,538,467 which is incorporated herein by reference.

FIELD OF THE INVENTION

The present invention relates to "First In First Out" ("FIFOs") queues. More specifically, the present invention relates to FIFO queues that allow stored data to be read more than once.

BACKGROUND OF THE INVENTION

FIFO queues are well known in the art of computing. FIFO queues can be implemented in software or hardware. Typically, a hardware-implemented FIFO queue integrates a memory device with associated on-chip logic, which can be utilized in a wide variety of applications that may require data to be buffered.

A FIFO queue gets its name (that is, First In First Out) from the fact that the data buffered in the FIFO queue's memory is retrieved from the FIFO queue's memory in the same order that it was written to the FIFO queue's memory. That is, the First data element to be stored In the FIFO queue's memory is the First data element to be retrieved Out of the FIFO queue's memory. Similarly, the last data element to be stored in the FIFO queue is the last data element to be retrieved from the queue. The operation of storing a data element in the FIFO queue's memory is generally referred to as a "write" or a "push." The operation of retrieving a data element from the FIFO queue's memory is generally referred to as a "read" or a "pop."

A conventional FIFO queue typically comprises storage elements, a write pointer, a write signal, a read pointer, a read signal, a full signal, an empty signal, and a reset signal. The storage elements are used for storing data and can be thought of as memory locations where each memory location has an address. The data stored in the storage elements may be referred to herein as data elements. The write pointer contains the address of the storage element where the next data element is to be written. That is, the write pointer "points to" the storage element into which the next data element will be written. The write signal is an input signal that is asserted to cause a data element to be written into the FIFO queue's storage element pointed to by the write pointer. When the write signal is asserted a data element is written into the storage element pointed to by the write pointer. The read pointer contains the address of the storage element containing the next data element to be retrieved or read from the FIFO queue's storage elements. That is, the read pointer points to the storage element containing the next data element to be read. The read signal is an input signal that is asserted to cause a data element to be read from one of the FIFO queue's storage elements. When the read signal is asserted the data element pointed to by the read pointer is retrieved or read. A full signal is an output signal that is asserted to indicate that the FIFO queue's storage elements are full and no more data can be written into the FIFO queue's storage elements. In other words, the full signal is asserted when the FIFO queue is full. An empty signal is an output signal that is asserted to indicate that the FIFO queue's storage elements are empty and that no data is available to be read from the FIFO queue's storage elements. In other words, the empty signal is asserted when the FIFO queue is empty. A reset signal is an input signal that causes the FIFO queue to become empty.

Conventional FIFO queues have the property that each data element stored in the FIFO queue can be read from the FIFO queue only once. This is because the read pointer is incremented every time a data element is read from the FIFO queue. Once the read pointer is incremented, the storage element just read from becomes available to be written to and the previous data element can then be overwritten and lost. However, in some applications it may be desirable to read some data elements more than once. This may happen, for example, while stepping through a loop construct in a computer program. Thus, in applications where it is desirable to read some data elements more than once conventional FIFO queues are not well suited.

SUMMARY OF THE INVENTION

The present invention addresses the issues above by providing FIFO queues that enable multiple accesses to data stored in the FIFO queue. According to the present invention, conventional FIFO queues can be augmented by the addition of one or more pointers, referred to herein as release pointers, one or more input signals, referred to herein as "repeat" signals, and one or more input signals, referred to herein as "release" signals. In one embodiment of the present invention, a release pointer points to a location in the queue (that is, one of the storage elements) containing a data element that has already been read. The release signal is an input signal that causes the release pointer to be incremented when the release signal is asserted. As long as the release signal is not asserted, the release pointer does not change while a read pointer is used to read data from the queue. The release pointer can be viewed as saving a location in the queue containing data that has already been read. In order to allow the read pointer to go back and reread previously read data, the repeat signal can be asserted. Asserting the repeat signal causes the read pointer to be set to the value of the release pointer. This allows the read pointer to be "rewound" to a location containing data already read (that is, the location pointed to by the release pointer) and start reading data that has already been read. The read pointer can be rewound as many times as desired. Once the data is no longer needed, the release signal can be asserted, causing the release pointer to be incremented along with the read pointer. Incrementing the release pointer frees up memory locations so that new data can be stored in them. Other embodiments may comprise multiple release pointers, multiple release signals, and multiple repeat signals.

Other embodiments of the present invention comprise an input signal, referred to herein as a switch signal. A switch signal causes the read pointer to switch values with a release pointer. That is, the read pointer takes on the value of the release pointer and the release pointer takes on the value of the read pointer. Switching values with a release pointer sets the read pointer to a location containing data already read and allows the read pointer to be utilized to reread the previously read data. In still other embodiments of the present invention, FIFO queues comprise multiple read pointers and an input signal for determining which read pointer is used to read data.

The present invention can be advantageously utilized, for example, in implementing certain programming constructs more efficiently than can be implemented using FIFO queues of the prior art. Looping constructs are an example of a programming construct that can be implemented efficiently using FIFO queues of the present invention.

DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 4 illustrates a programming construct, which can be efficiently implemented utilizing the present invention.

DETAILED DESCRIPTION OF THE INVENTION

In the following detailed description of the present invention, reference is made to the accompanying Drawings, which form a part hereof, and in which are shown by way of illustration specific embodiments in which the present invention may be practiced. It should be understood that other embodiments may be utilized and structural changes may be made without departing from the scope of the present invention.

Figure 1:
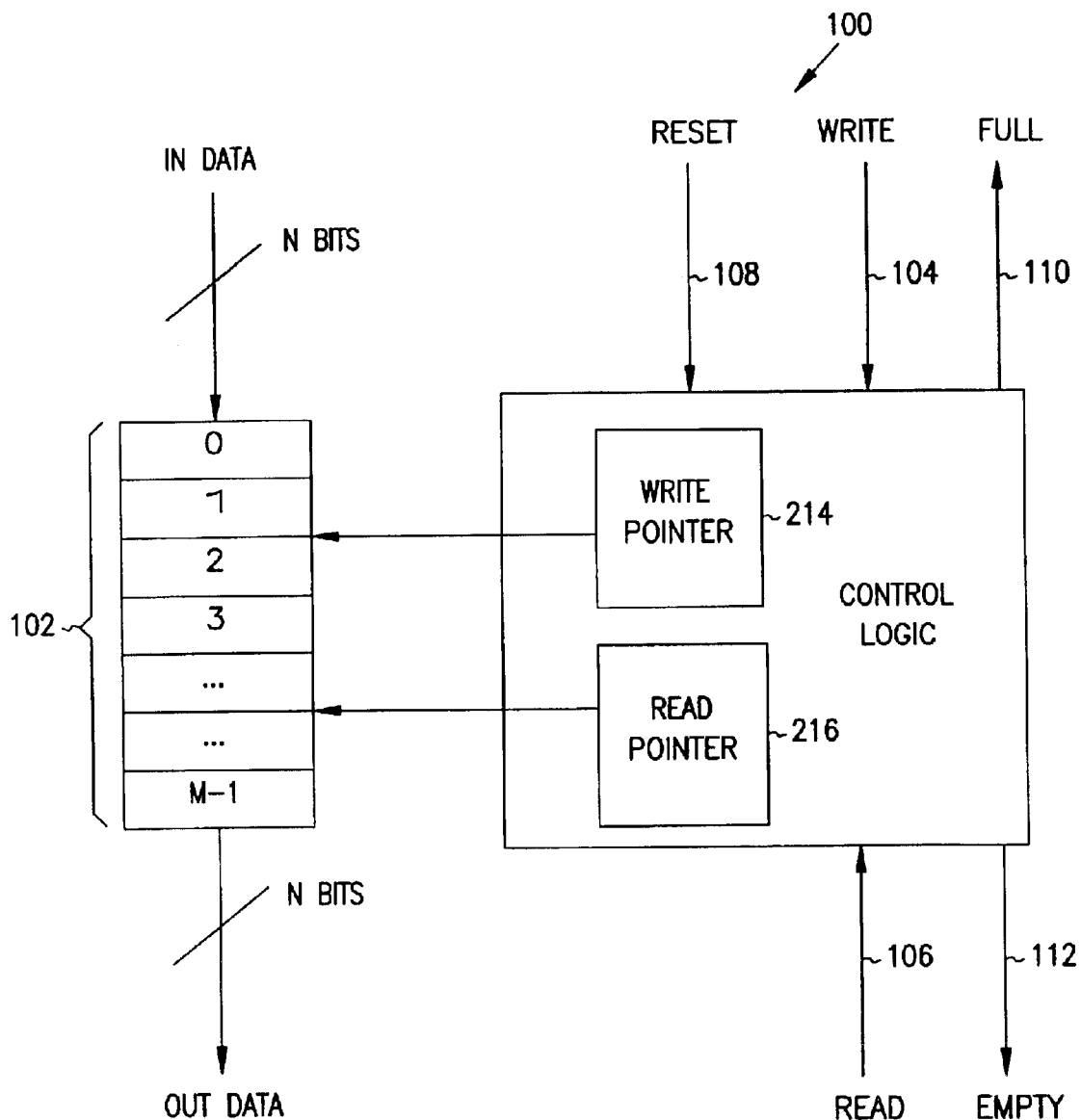
FIG. 1 illustrates an example of a prior art FIFO queue.

FIG. 1 illustrates an example of a FIFO queue 100 according to the prior art. In FIFO queue 100, data is stored in storage elements 102. Storage elements 102 can be implemented in any manner known in the art. Storage elements 102 may comprise, for example, flip flops, a shift register, or random access memory such as SRAM. Prior art FIFO queues also comprise an input signal to control when to write data elements into the FIFO queue. This input signal is referred to as a "write" signal or a "push" signal. The act of storing or writing a data element into a FIFO queue is referred to as a "write" or a "push." In FIG. 1, FIFO queue 100 comprises write signal 104. Similarly, FIFO queues also comprise an input signal to control when to read elements from the FIFO queue. A read signal is illustrated in FIG. 1 as read signal 106. Prior art FIFO queues also generally comprise an input signal to reset the FIFO queue, that is, to force the FIFO queue to become empty. This is illustrated in FIG. 1 as reset signal 108. A full signal, such as full signal 110, is an output signal to indicate a "full" status. Generally, a full signal is generated by comparing the write pointer with the read pointer. For example, in some prior art FIFO queues, a full signal is generated when the read pointer and write pointer are equal to each other. In other prior art FIFO queues, a full signal is generated when the read pointer and write pointer point to adjacent storage elements. When a FIFO queue is full, no new data elements can be written into the FIFO queue. Similarly, an empty signal, such as empty signal 112, is an output signal to indicate an "empty" status. When a FIFO queue is empty, no data elements can be read from the FIFO queue. A FIFO queue also comprises a pointer that points to the position in the FIFO queue's memory where the next data element will be written. This is illustrated in FIG. 1 as write pointer 114. Similarly, a FIFO queue comprises a pointer that points to the position in the FIFO queue's memory containing the next data element to be read from the FIFO queue. This is illustrated in FIG. 1 as read pointer 116. Additionally, FIFO queues comprise control logic for manipulating the read/write pointers based on control signals (for example, reset, increment, and wrap) as well as control logic to assert status signals, such as full status and empty status.

Typically in a conventional FIFO queue, when a data element is read, the read pointer (for example, read pointer 116 in FIG. 1) is incremented so as to point to the next storage element in which a readable data element has been stored. Thus, the storage element from which the data element was just read becomes available to be overwritten with newly written data. In this manner, each stored data element is read only once (that is, can be accessed only once) and the corresponding storage element can be overwritten once the data is read. It should be understood that when referring to incrementing pointers, it is meant (unless herein stated otherwise) that the pointer is modified (typically by either adding one or subtracting one) so that the pointer points to the next available storage element. Thus, incrementing a pointer does not necessarily mean that the incremented value of the pointer has a greater numerical value than the old value of the pointer.

The present invention provides a FIFO queue that enables multiple accesses to data stored in the FIFO queue. In a first embodiment, the present invention provides multiple accesses to data by utilizing a pointer referred to herein as a "release pointer," an input signal referred to herein as a "release signal," and an input signal referred to herein as a "repeat signal." In a second embodiment, the present invention provides multiple accesses to data by utilizing multiple read pointers. In a third embodiment, the present invention provides multiple accesses to data by utilizing multiple release pointers. In a fourth embodiment, the present invention provides multiple accesses to data by utilizing a switch signal.

Figure 2:
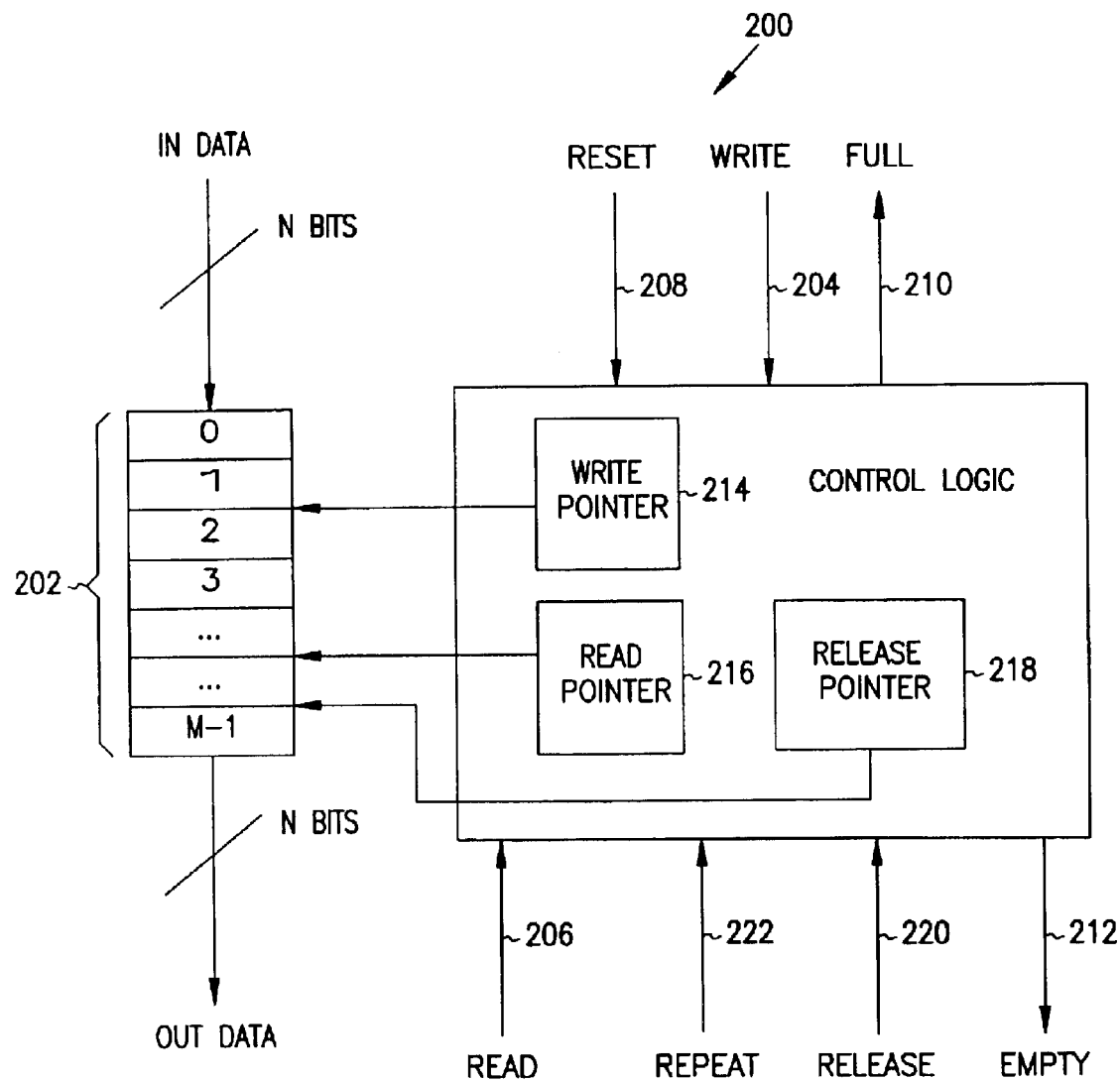
FIG. 2 illustrates an embodiment of a FIFO queue according to the present invention.

FIG. 2 illustrates an embodiment of a FIFO queue 200 according to the present invention. FIFO queue 200 is similar to FIFO queue 100 of FIG. 1 except that FIFO queue 200 additionally comprises release pointer 218, release signal 220, and repeat signal 222. In FIFO queue 200, data is stored in storage elements 202. Storage elements 202 can be implemented in the same manner as is done in FIFO queues of the prior art. Storage elements 202 may comprise, for example, flip flops, a shift register, or random access memory such as SRAM. In FIG. 2, FIFO queue 200 comprises write signal 204 and read signal 206. An input signal to reset the FIFO queue, that is, to force the FIFO queue to become empty is illustrated in FIG. 2 as reset signal 208. Full signal 210 can indicate a "full" status. Similarly, empty signal 212, is an output signal to indicate an "empty" status. Also illustrated in FIG. 2 is write pointer 214 and read pointer 216. Additionally, FIFO queue 200 comprises control logic for manipulating the read/write pointers based on control signals (for example, reset, increment, and wrap) as well as control logic to assert status signals, such as full status and empty status.

FIFO queues of the present invention operate differently that FIFO queues of the prior art in a number of ways. For example, in FIFO queues of the present invention a "full" status is generated by comparing the write pointer to the release pointer and not by comparing the write pointer to the read pointer as is done in the prior art. Thus, in one embodiment of the present invention the full signal is asserted when the write pointer and the release pointer are equal. In another embodiment of the present invention, the full signal can be asserted when the write pointer and the release pointer are adjacent (that is, when incrementing one of the pointers would make it equal to the other pointer). When a reset signal is received by FIFO queues of the present invention, the queue is forced to become empty. In one embodiment of the present invention, asserting the reset signal causes the release pointer, the read pointer, and the write pointer all to be set to the same value. The release signal operates relative to the release pointer in a manner that is analogous to the manner that the read signal operates relative to the read pointer. For example, if asserting the read signal causes the read pointer to get incremented, then asserting the release signal causes the release pointer to get incremented. Also, in FIFO queues of the present invention, the repeat signal sets the read pointer to the value of the release pointer.

It should be understood that the actual storage elements utilized in FIFO queues of the present invention can be implemented in identical manners as are storage elements utilized in FIFO queues of the prior art. For example, storage elements of the present invention may comprise flip flops, a shift register, or random access memory such as SRAM, for example. Additionally, one of ordinary skill in the art will know how to implement the various pointers, signals, and control logic of the present invention without undue experimentation. The specific implementation of the present invention can vary from one embodiment to another so long as the various aspects of the present invention function in the manner described herein.

Figure 3:
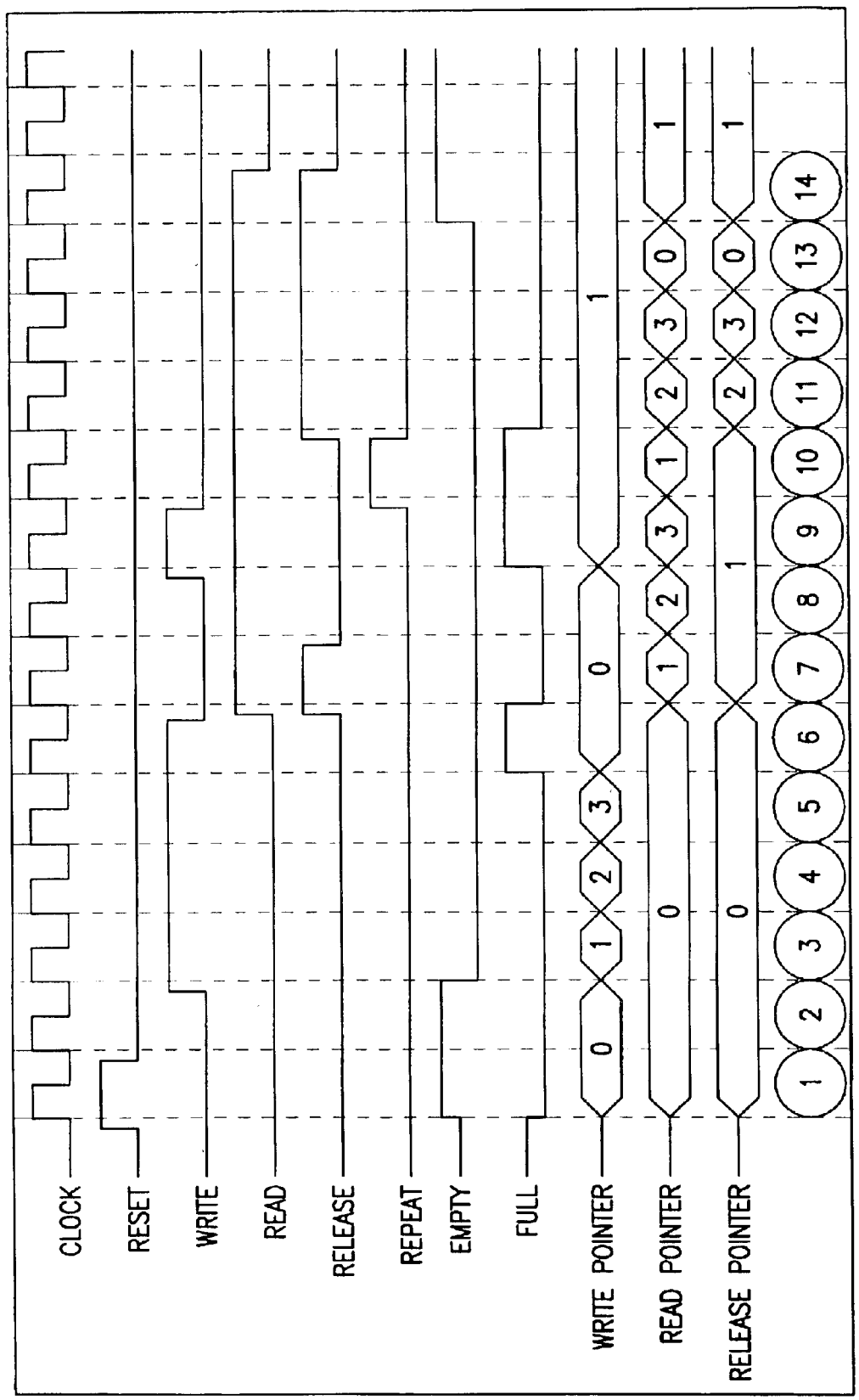
FIG. 3 illustrates a waveform diagram depicting an example operation of an embodiment of the present invention.

FIG. 3 shows a waveform diagram that illustrates an example of how an embodiment of the present invention operates. In FIG. 3, clock cycles are shown at the top of the diagram. Each cycle is numbered and the cycle numbering appears at the bottom of the diagram as encircled numbers. The FIFO queue used to produce the waveform diagram in FIG. 3 has only four storage elements. The small number of storage elements was chosen for purposes of simplifying the explanation of how the FIFO queue operates. However, it should be understood that FIFO queues of the present invention can have a significantly larger number of storage elements.

In Cycle 1 of FIG. 3, the reset signal has been asserted. The reset signal of the FIFO queue embodied in FIG. 3 causes the write pointer, read pointer, and release pointer to be set to the same value. In the example of FIG. 3, all three pointers are set to zero. Also during Cycle 1, the empty signal gets asserted. During Cycle 2, the reset signal is deasserted. The pointer values do not change and the empty signal remains asserted. During Cycles 2–5, the write signal is asserted and the write pointer is incremented in each of the four cycles as data elements are stored in the storage elements. When the first data element is stored at the beginning of Cycle 3, the empty signal is deasserted as the FIFO queue is no longer empty. During Cycle 5, the write signal remains asserted, causing the write pointer to be incremented again at the beginnin of Cycle 6. Incrementing the write pointer causes the write pointer to "wrap around." The phrase wrap around is well known in the art. In this instance, the write pointer wraps around because before it is incremented it is pointing to the highest numbered storage element (this is, 3) and after it is incremented it is pointing to the lowest numbered storage element (that is, 0). Once the write pointer is incremented during Cycle 6, it has the same value as the release pointer. Thus, the write pointer has "caught up" to the release pointer. When the write pointer catches up to the release pointer in Cycle 6, the full signal is asserted indicating the FIFO queue is full. At this point, the FIFO queue is full because writing a data element to the storage element pointed to by the write pointer would overwrite the data element stored in the storage element pointed to by the release pointer, which a user may still wish to read.

Cycle 6 demonstrates a use of the release signal. During Cycle 6, both the read signal and release signal are asserted causing both the read pointer and the release pointer to be incremented in the following cycle. The incrementing of the release pointer causes it to have a different value than the write pointer. Accordingly, the FIFO queue embodied in FIG. 3 is no longer full and the full signal is deasserted. During Cycle 7, the read signal is asserted, but the release signal is not asserted. This causes the read pointer to be incremented, but the release pointer is not incremented. During Cycle 8, the write signal is asserted so the write pointer is incremented at the beginning of Cycle 9. At this point, the write pointer once again has caught up to the release pointer causing the FIFO queue to be full. Accordingly, the full signal is again asserted.

Cycle 9 demonstrates a use of the repeat signal. During Cycle 9, the repeat signal is asserted. Asserting the repeat signal causes the value of the read pointer to be set to the value of the release pointer at the beginning of the following cycle. In Cycle 10, the read pointer gets set to the value 1. Setting the value of the read pointer to the value of the release pointer allows previous data to be reread. Thus, the FIFO queue in a sense is "rewound" when the repeat signal is asserted.

During Cycle 10, the read signal remains asserted and the release signal also is asserted. This causes both the read pointer and the release pointer to be incremented. The FIFO queue is no longer full so the full signal is deasserted. During Cycles 11 and 12, the read signal and the release signal remain asserted and the read pointer and release pointer are incremented accordingly. During Cycle 13, the read signal and release signal also remain asserted and the read pointer and release pointer are incremented just as in Cycles 12 and 13. However, in Cycle 14, the read pointer and release pointer catch up to the write pointer so the FIFO queue is now empty. Accordingly, the empty signal is asserted.

FIFO queues of the present invention may also optionally comprise a second empty signal. For purposes of the present specification this second empty signal is referred to as a "next empty" signal. The next empty signal can be thought of as a warning. The next empty signal gets asserted to indicate that the next read will cause the FIFO queue to become empty. Thus, the next empty signal can be utilized to gain better performance by reducing or eliminating wasted cycles trying to read from an empty FIFO queue.

FIFO queues of the present invention may also optionally comprise additional release pointers, additional release signals to control when the additional release pointers are updated, and additional repeat signals for setting the read pointer to the value of one of the release signals. In this manner, a user can set release pointers to various points in the FIFO queue and later set the value of the read pointer to the value of any one of the release pointers and reread the data starting at the chosen release pointer. In one embodiment, each release pointer has a corresponding release signal and a corresponding repeat signal. Accordingly, a release pointer will be incremented when its corresponding release signal is asserted. Also, when a repeat signal is asserted the read pointer will get set to the value of the release pointer corresponding to the repeat signal that is asserted.

Two sets of control signals (for example, one set of release signals and one set of repeat signals) can be implemented in ceiling(log 2(P)) bits along with an enable bit for each set. That is, P control signals (for example, P release signals) can be implemented as a single input line to the FIFO queue with the number of bits in the line determined by the number of control signals implemented. Which control signal that gets asserted can be determined by the binary value of the bits in the input line. Alternatively, the P control signals can be implemented using P corresponding physical input lines where each input line is essentially a single bit that determines whether the corresponding control signal is asserted or not.

FIFO queues of the present invention can also be advantageously utilized in conjunction with one or more input signals that will be referred to herein as switch signals. Switch signals in the present invention can be used in conjunction with multiple read pointers. The multiple read pointers can each point to different locations in the queue. The switch signal determines which read pointer will be utilized to read the next data element from the queue. When two read pointers are utilized, the switch signal toggles the two pointers so that during any read operation only one of the read pointers is used to read data. In one embodiment for example, when the switch signal is asserted the reading of data proceeds from a first read pointer and when the signal is not asserted the reading of data proceeds from a second pointer.

Alternatively, instead of actually determining which read pointer is used to read data, switch signals can be advantageously utilized in conjunction with a single read pointer and one or more release pointers. When used in this way, the switch signal will exchange the value of the read pointer with the value of one of the release pointers. In this manner, when the switch signal is asserted, the current value of the read pointer is saved in one of the release pointers and reading proceeds from a location pointed to by one of the release pointers. At a later point in time, the switch signal can be asserted again causing the read pointer to assume the value of the saved location and reading can be resumed from that location.

The present invention can be advantageously utilized, for example, in implementing programming looping constructs efficiently. FIG. 4 illustrates an example of a programming construct written in the C programming language. In FIG. 4, the programming variable FIFO is an array of data elements. The use of such data structures (that is, arrays) is extremely common in the programming arts and is used in virtually every existing programming language. In the example, the variables "fifoEntry1" and "fifoEntry2" point to two different locations in the array FIFO. The example contains two looping constructs, referred herein as the inner loop and the outer loop. The inner loop uses the variable "j" to access the data elements in the array FIFO one at a time. The value of "j" is initially set at the value of the variable "fifoEntry1" and is repeatedly incremented until the value of "j" exceeds the value of "fifoEntry2." For each value of j, the variable "data" is set equal to the data element located at the position of the array FIFO indicated by the value of the variable "j.". That is, each time the variable "j" is incremented, the data element in the "jth position" of the array FIFO is read and then stored into the variable "data." The variable "data" and the data element stored therein can then be used in any manner that is known in the programming arts. Once the inner loop has completed, the outer loop causes the inner loop to be repeated a number of times equal to the value of the variable "number$_{13}$of$_{13}$repeats."

Programming constructs like the one shown in FIG. 4 can be implemented efficiently using a FIFO queue of the present invention. For example, the data in the array FIFO could be stored in a FIFO queue of the present invention. The value of both the read pointer and the release pointer could be set to a value corresponding to the value of the variable "fifoEntry1." The inner loop could be executed by issuing read signals to the FIFO queue while the release signal was not asserted. Thus, each element in the FIFO queue could be read one at a time until the read pointer reached the value of the variable "fifoEntry2." At this point, a repeat signal could be asserted, setting the read pointer back to the value of the release pointer (that is, back to the value of the variable "fifoEntry1"). Then the inner loop can be executed again by asserting read signals while the release signal is not asserted. In this manner, the inner loop can be executed efficiently the number times determined by the outer loop.

FIFO queues of the prior art could not execute the programming construct of FIG. 4 as efficiently. If a prior art FIFO queue were utilized, the data in the queue would have to be reloaded into the FIFO queue before each execution of the inner loop. This is because prior art FIFO queues do not allow stored data to be read more than once.

Thus, the present invention provides multi-access FIFO queues, which can be advantageously utilized to implement programming constructs more efficiently than they can be implemented using FIFO queues of the prior art. This is accomplished by utilizing one or more release pointers, one or more release signals, and one or more repeat signals. As data is read from a multi-access FIFO queue of the present invention, the one or more release pointers can remain at locations in the queue where previously read data is stored. At a later point in time, the read pointer can be reset to the value of one of the release pointers (by asserting the repeat signal) and the data starting at that location can be read again. When rereading data is not desired, the release signal is asserted causing the release pointer to be incremented along with the read pointer.

What is claimed is:

1. FIFO system, comprising:
    a read pointer adapted to point to a to-be-read storage element;
    a release pointer adapted to point to a previously read storage element; and
    a repeat signal that sets the read pointer equal to the release pointer when asserted.

2. The FIFO system according to claim 1, wherein the read pointer is incremented when a read signal is asserted.

3. The FIFO system according to claim 1, further comprising a release signal, wherein the release pointer is incremented when the release signal is asserted.

4. A FIFO system, comprising:
    a read pointer adapted to point to a to-be-read storage element;
    a release pointer adapted to point to a previously read storage element; and
    a release signal that controls when the release pointer is incremented.

5. The FIFO system according to claim 4, wherein the release pointer is incremented when the release signal is asserted.

6. A FIFO system comprising:
    a write signal adapted to control when data elements are stored into storage elements;
    a write pointer adapted to point to a next storage element;
    a read pointer adapted to point to a to-be-read storage element; and
    a release pointer adapted to point to a previously read storage element.

7. The FIFO system according to claim 6, further comprising a repeat signal adapted to set the read pointer equal to the release pointer.

8. The FIFO system according to claim 6, wherein the read pointer is incremented when a read signal is asserted.

9. The FIFO system according to claim 6, further comprising a release signal adapted to control when the release pointer is incremented.

10. The FIFO system according to claim 6, wherein an empty signal is asserted when the write pointer, the read pointer, and the release pointer all have the same value.

11. A FIFO system, comprising:
a read pointer adapted to point to to-be-read storage elements;
two or more release pointers adapted to point to previously read storage elements; and
one or more repeat signals that set the read pointer equal to one of the release pointers.

12. The FIFO system according to claim 11, wherein the read pointer is incremented when a read signal is asserted.

13. A FIFO system, comprising:
two or more read pointers adapted to point to to-be-read storage elements; and an input signal that determines which of the two or more read pointers is used to read the storage elements when a read signal is asserted.

14. The FIFO system according to claim 13, wherein the two or more read pointers are incremented when the read signal is asserted.

15. The FIFO system according to claim 13, further comprising a next empty signal that is asserted whenever asserting the read signal would cause the FIFO system to become empty.

16. A FIFO system, comprising:
two or more read pointers adapted to point to to-be-read storage elements;
an input signal that determines which of the two or more read pointers is used to read the storage elements when a read signal is asserted; and
a release pointer adapted to point to a previously read storage element.

17. The FIFO system according to claim 16, further comprising a release signal adapted to controls when the release pointer is incremented.

18. The FIFO system according to claim 16, wherein the two or more read pointers are incremented when the read signal is asserted.

19. The FIFO system according to claim 16, further comprising a next empty signal that is asserted whenever asserting the read signal would cause the system to become empty.

20. A FIFO system, comprising:
a read pointer adapted to point to a to-be-read storage element;
a release pointer adapted to point to a previously read storage element; and
a switch signal that sets the read pointer equal to the release pointer when asserted.

21. The FIFO system according to claim 20, further comprising a release signal, wherein the release pointer is incremented when the release signal is asserted.

22. A FIFO system, comprising:
a write pointer adapted to point to a next storage element;
a read pointer adapted to point to a to-be-read storage element;
a release pointer adapted to point to a previously read storage element.
a release signal adapted to control when the release pointer is incremented;
a repeat signal adapted to set the read pointer equal to the release pointer when asserted;
a full signal that indicates when the system is full;
an empty signal that indicates when the system is empty; and
a reset signal adapted to empty the system.

23. The FIFO system according to claim 22, wherein the write pointer, the read pointer, and the release pointer are all set to the same value when the reset signal is asserted.

24. A FIFO system, comprising:
a write pointer adapted to point to a next storage element;
a read pointer adapted to point to a to-be-read storage element;
a release pointer adapted to point to a previously read storage element.
a release signal adapted to control when the release pointer is incremented;
a repeat signal adapted to set the read pointer equal to the release pointer when asserted;
a full signal that indicates when the system is full;
an empty signal that indicates when the system is empty;
a reset signal adapted to empty the system; and
a next empty signal that is asserted when asserting a read signal would cause the FIFO system to become empty.

25. The FIFO system according to claim 24, wherein the write pointer, the read pointer, and the release pointer are all set to the same value when the reset signal is asserted.

26. A method for storing and retrieving data from a FIFO system, comprising:
setting a read pointer to a to-be-read storage element;
setting a release pointer to a previously read storage element; and
implementing a repeat signal that sets the read pointer equal to the release pointer when asserted.

27. A FIFO method, comprising:
setting a read pointer to a to-be-read storage element;
setting a release pointer to a previously read storage element; and
implementing a release signal adapted to incrementing the release pointer.

28. A FIFO method, comprising:
implementing a write signal that controls when data elements are stored into storage elements;
setting a write pointer adapted to point to a next storage element;
setting a read pointer adapted to point to a to-be-read storage element; and
setting a release pointer adapted to point to a previously read storage element.

29. A FIFO method, comprising:
setting a read pointer adapted to point to a to-be-read storage element;
setting two or more release pointers adapted to point to a previously read storage element; and
implementing one or more repeat signals that set the read pointer equal to one of the release pointers.

30. A FIFO method, comprising:
setting two or more read pointers adapted to point to to-be-read storage elements; and
implementing an input signal that determines which of the two or more read pointers is used to read the storage elements when a read signal is asserted.

31. A FIFO method, comprising:

setting two or more read pointers adapted to point to to-be-read storage elements;

implementing an input signal that determines which of the two or more read pointers is used to read the storage elements when a read signal is asserted; and setting a release pointer adapted to point to a previously read storage element.

32. A FIFO method, comprising:

setting a write pointer adapted to point to a next storage element;

setting a read pointer adapted to point to a to-be-read storage element;

setting a release pointer adapted to point to a previously read storage element;

implementing a release signal that controls when the release pointer is incremented;

implementing a repeat signal that sets the read pointer equal to the release pointer when asserted;

implementing a full signal that is asserted when the system is full;

implementing an empty signal that is asserted when the system is empty; and implementing a reset signal that causes the system to become empty when asserted.

33. A FIFO method, comprising:

setting a write pointer adapted to point to a next storage element;

setting a read pointer adapted to point to a to-be-read storage element;

setting a release pointer adapted to point to a previously read storage element;

implementing a release signal that controls when the release pointer is incremented;

implementing a repeat signal that sets the read pointer equal to the release pointer when asserted;

implementing a full signal that is asserted when the system is full;

implementing an empty signal that is asserted when the system is empty;

implementing a reset signal that causes the system to become empty when asserted; and implementing a next empty signal that is asserted when asserting a read signal would cause the FIFO system to become empty.

* * * * *

UNITED STATES PATENT AND TRADEMARK OFFICE
CERTIFICATE OF CORRECTION

PATENT NO.   : 6,873,180 B2
DATED        : March 29, 2005
INVENTOR(S)  : Ole Bentz It is certified that error appears in the above-identified patent and that said Letters Patent is hereby corrected as shown below:

Column 6,
Line 65, delete "(log 2(P))" and insert -- (log2(P)) --, therefor.

Column 7,
Line 62, delete "number$_{13}$of$_{13}$repeats" and insert -- number_of_repeats --, therefor.

Column 8,
Line 37, insert -- A -- before "FIFO".

Signed and Sealed this

Seventh Day of June, 2005

JON W. DUDAS
*Director of the United States Patent and Trademark Office*